(12) United States Patent
Lee et al.

(10) Patent No.: US 8,296,015 B2
(45) Date of Patent: Oct. 23, 2012

(54) METHOD AND APPARATUS FOR DECIDE TURN CONDITION USING SENSOR

(75) Inventors: Kwon Soo Lee, Ansan-si (KR); Yong Kwan Park, Seoul (KR)

(73) Assignee: Thinkware Systems Corporation, Seoul (KR)

( * ) Notice: Subject to any disclaimer, the term of this patent is extended or adjusted under 35 U.S.C. 154(b) by 444 days.

(21) Appl. No.: 12/599,811

(22) PCT Filed: Jun. 25, 2007

(86) PCT No.: PCT/KR2007/003057
§ 371 (c)(1),
(2), (4) Date: Nov. 11, 2009

(87) PCT Pub. No.: WO2008/140146
PCT Pub. Date: Nov. 20, 2008

(65) Prior Publication Data
US 2010/0222956 A1    Sep. 2, 2010

(30) Foreign Application Priority Data

May 11, 2007  (KR) .................. 10-2007-0046084

(51) Int. Cl.
*A01B 69/00* (2006.01)
(52) U.S. Cl. .................... 701/41; 180/197; 340/465
(58) Field of Classification Search .............. 701/41, 701/70; 180/97, 445; 340/465
See application file for complete search history.

(56) References Cited

U.S. PATENT DOCUMENTS

| | | | |
|---|---|---|---|
| 6,285,933 B1 * | 9/2001 | Kohler et al. | 701/33.6 |
| 6,324,458 B1 * | 11/2001 | Takagi et al. | 701/70 |
| 6,454,036 B1 | 9/2002 | Airey et al. | |
| 6,725,173 B2 | 4/2004 | Dong et al. | |
| 6,918,186 B2 | 7/2005 | Ash et al. | |
| 8,050,820 B2 * | 11/2011 | Yanaka et al. | 701/37 |
| 2002/0065121 A1 | 5/2002 | Fukunaga et al. | |
| 2003/0125856 A1 * | 7/2003 | Lin et al. | 701/37 |
| 2005/0107939 A1 * | 5/2005 | Sadano et al. | 701/70 |
| 2006/0100783 A1 * | 5/2006 | Haberer et al. | 701/301 |
| 2006/0108170 A1 * | 5/2006 | Ishikawa et al. | 180/282 |
| 2006/0195258 A1 * | 8/2006 | Kim et al. | 701/211 |
| 2007/0055432 A1 * | 3/2007 | Koibuchi et al. | 701/72 |

(Continued)

FOREIGN PATENT DOCUMENTS

| | | |
|---|---|---|
| JP | 05-001915 | 1/1993 |
| JP | 08-304090 | 11/1996 |

(Continued)

OTHER PUBLICATIONS

International Search Report mailed Feb. 5, 2008, for International Application No. PCT/KR2007/003057.

*Primary Examiner* — Helal A Algahaim
(74) *Attorney, Agent, or Firm* — Saliwanchik, Lloyd & Eisenschenk

(57) ABSTRACT

A method and apparatus of determining a straight-driving state or a turning state of a moving object using an acceleration sensor are provided. The method of determining a turning state using a sensor includes: reading sensor output signals of different axes from an acceleration sensor while a moving object is being driven wherein the acceleration sensor is an at least two axes acceleration sensor and detects an acceleration of the moving object; and comparing the read sensor output signals of the different axes and determining whether the moving object is in a straight-driving state or in a turning state.

10 Claims, 3 Drawing Sheets

U.S. PATENT DOCUMENTS

2009/0088939 A1* 4/2009 To et al. .......................... 701/72

FOREIGN PATENT DOCUMENTS

| KR | 1020010040155 | 5/2004 |
| KR | 1020050024032 | 3/2005 |
| KR | 1020060018311 | 3/2006 |
| KR | 1020060055920 | 5/2006 |
| KR | 1020060111246 | 10/2006 |

* cited by examiner

METHOD AND APPARATUS FOR DECIDE TURN CONDITION USING SENSOR

FIELD OF THE DISCLOSURE

The present disclosure relates to a navigation system, and more particularly, to a method and apparatus for determining a straight-driving state or a turning state of a moving object using an acceleration sensor.

BACKGROUND OF THE DISCLOSURE

Generally, a navigation system is a system which provides information for driving of a transportation device such as a vehicle by using an artificial satellite. The navigation system is automatic.

A typical navigation system is configured into one terminal and includes a storage medium to store map data. Also, the navigation system includes a Global Positioning System (GPS) receiver to receive GPS signals.

The navigation system calculates a location of a vehicle, informs a user of a current location of the vehicle based on the calculated location of the vehicle. Also, the navigation system routes an optimal path from the current location to the user's desired destination and guides the user to the desired location, providing the user with various types of associated information along the path.

A method of calculating a location of a vehicle receives location data from a GPS satellite using a GPS receiver, and calculates the current location of the vehicle based on the received location data.

Another method of calculating a location of a vehicle calculates the current location of the vehicle using a gyro sensor and an acceleration sensor, which are installed in the vehicle. In this instance, the other method receives GPS signals, calculates the current location of the vehicle based on the received GPS signals, and corrects the calculated current location based on results detected by the gyro sensor and the acceleration sensor.

An at least two-axis acceleration sensor is included to determine whether the vehicle is turning left or right. In this instance, it is possible to completely match one axis of the two axes of the acceleration sensor with a driving direction of the vehicle and match another axis of the acceleration sensor with a left/right direction of the vehicle, and thereby read only a value of a sensor corresponding to the left/right axis and determine a turning direction of the vehicle.

In the case of the method of determining the turning direction, when an installation method in a vehicle is not fixed such as a portable navigation device (PND), it is difficult to accurately install the PND by matching axes of a sensor with the driving direction of the vehicle and the left/right direction of the vehicle respectively. Also, when the user is required to accurately install the PND for the accurate operation, it may create some burdens for the user.

If a navigation device is not accurately installed, it may be determined the vehicle is turning even though the vehicle is in a straight-driving state. Also, it may be determined the vehicle is not turning even though the vehicle is in a turning state. Specifically, accurate determination may not be performed.

Specifically, in the above method, when only one axis of a sensor matching the left/right direction is used, for example, when a sensor value of a corresponding axis has a positive value, it is determined the vehicle is in a right-turning state. Conversely, when the sensor value has a negative value, it is determined the vehicle is in a left-turning state. Specifically, since a comparatively radical method is used, the installation method in the vehicle may be significantly affected. Also, data obtained from the sensor may be inaccurate.

SUMMARY OF THE DISCLOSURE

An aspect of the present disclosure provides a method and apparatus for determining a turning state which can reduce a burden to match each axis of a sensor in order to determine whether a moving object is in a straight-driving state or in a turning state.

An aspect of the present disclosure also provides a new method and apparatus for determining a turning state which can more accurately determine a driving direction of a moving object, such as a straight-driving direction, a left-turning direction, a right-turning direction, and the like.

According to an aspect of the present disclosure, there is provided a method of determining a driving state using a sensor, the method including: reading sensor output signals of different axes from an acceleration sensor while a moving object is being driven wherein the acceleration sensor is an at least two axes acceleration sensor and detects an acceleration of the moving object; and comparing the read sensor output signals of the different axes and determining whether the moving object is in a straight-driving state or in a turning state.

According to another aspect of the present disclosure, there is provided an apparatus for determining a turning state using a sensor, the apparatus including: an acceleration sensor including at least two axes to detect an acceleration according to a driving direction of a moving object and outputting sensor output signals of different axes while the moving object is being driven; and a determination unit comparing the sensor output signals of the different axes, output from the acceleration sensor, and determining whether the moving object is in a straight-driving state or in a left-turning state or in a right-turning state.

According to the present disclosure, it is possible to accurately determine a straight-driving state or a left/right-turning state of the moving object, without an acceleration sensor to detect an acceleration of a moving object being affected by an installation environment.

DETAILED DESCRIPTION OF EXEMPLARY EMBODIMENTS

Figure 1:
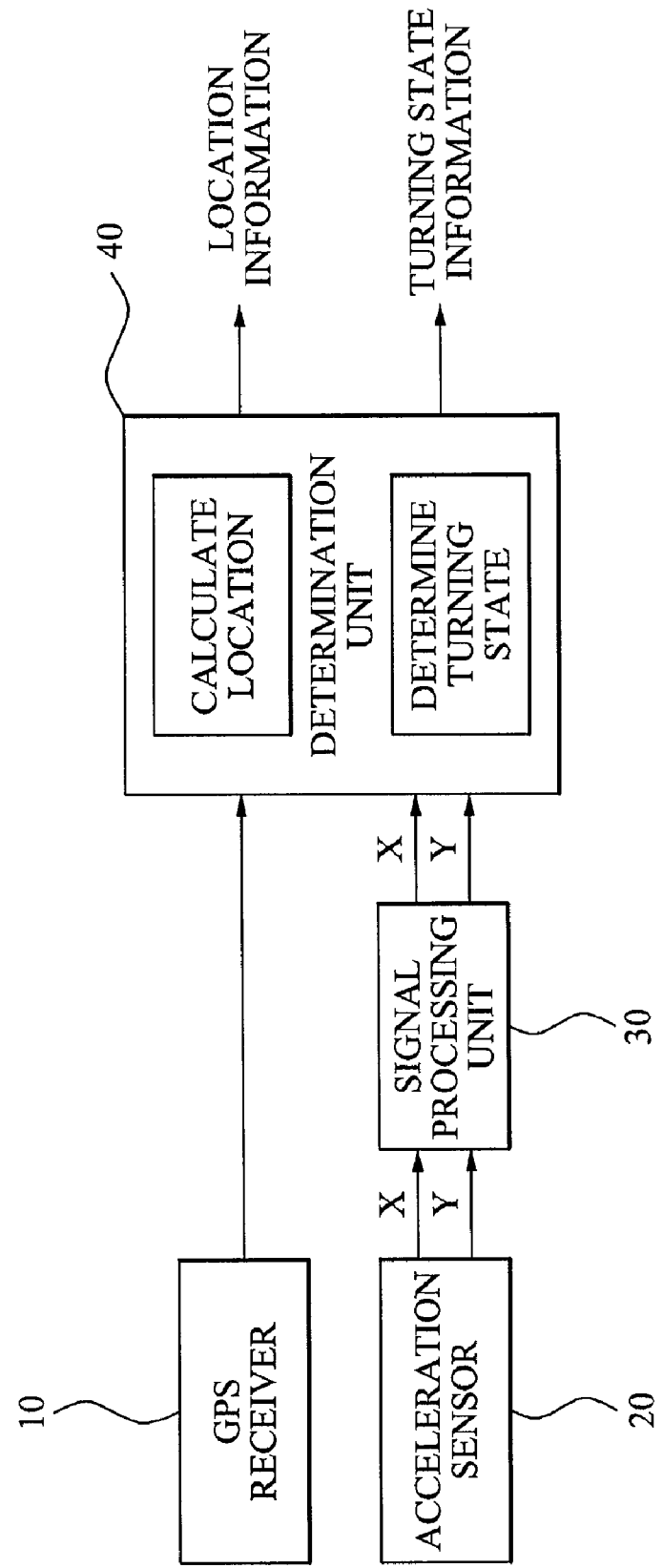
FIG. 1 illustrates a configuration of an apparatus for determining a turning state using a sensor according to an exemplary embodiment of the present disclosure.

Reference will now be made in detail to embodiments of the present disclosure, examples of which are illustrated in the accompanying drawings, wherein like reference numerals refer to the like elements throughout. The embodiments are described below in order to explain the present disclosure by referring to the figures.

Figure 2:
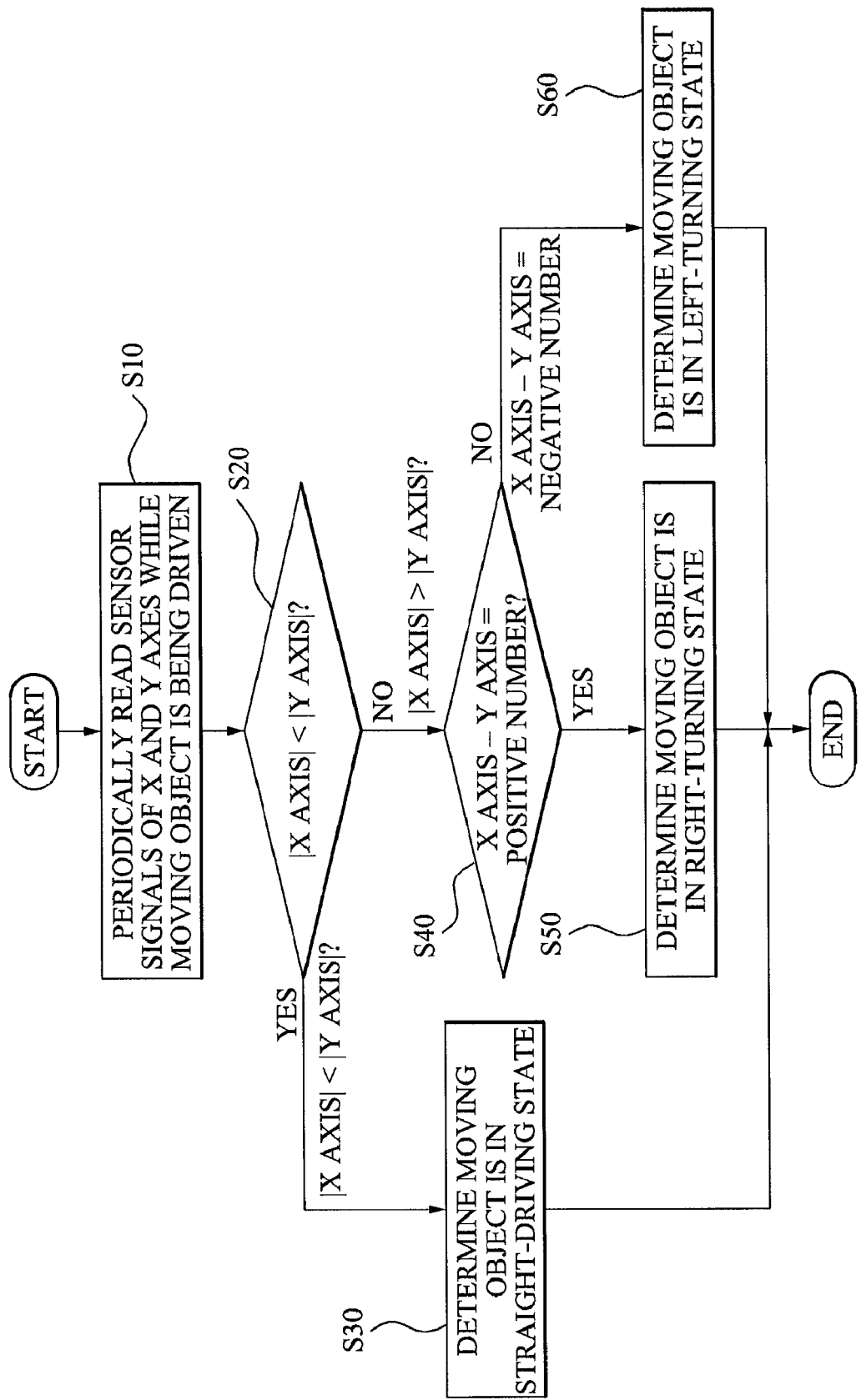
FIG. 2 is a flowchart illustrating a method of determining a turning state using a sensor according to an exemplary embodiment of the present disclosure.

FIG. 1 illustrates a configuration of an apparatus for determining a turning state using a sensor according to an exemplary embodiment of the present disclosure, and FIG. 2 is a flowchart illustrating a method of determining a turning state using a sensor according to an exemplary embodiment of the present disclosure.

Referring to FIG. 1, a turning state determining apparatus will be described in detail.

The turning state determining apparatus is applied to a navigation device which includes a Global Positioning System (GPS) receiver 10. The GPS receiver 10 receives location signals from at least three GPS satellites and calculates a location of the navigation device based on the received location signals. The navigation device may be a type of a portable navigation device (PND).

The navigation device may include an acceleration sensor. In this instance, the navigation device may calculate a current location of a moving object from GPS signals received by the GPS receiver 10, and correct the calculated current location based on signals that are detected by the acceleration sensor, and the like.

The turning state determining apparatus according to the present disclosure detects an acceleration with respect to a driving direction of the moving object and an acceleration with respect to a left/right direction of the moving object while the moving object is being driven, and then determines whether the moving object is in the straight-driving state or in the left/right-turning state based on a comparison between the detected accelerations with respect to the driving direction and the left/right direction.

For the above operation, as shown in FIG. 1, the turning state determining apparatus includes an acceleration sensor 20 to detect the acceleration of the moving object, a signal processing unit 30 to process a signal of the acceleration sensor 20, and a determination unit 40 to determine the straight-driving state or the turning state of the moving object based on an output signal of the acceleration sensor 20.

In the present disclosure, the acceleration sensor 20 uses an at least two-axis acceleration sensor, and outputs a sensor output signal with respect to each of the axes. Particularly, to detect the straight-driving state or the turning state of the moving object, it may be desirable to use both an acceleration sensor signal of an axis corresponding to the driving direction of the moving object and an acceleration sensor signal of an axis corresponding to the left/right direction. When the acceleration sensor 20 is a three-axis acceleration sensor, it is possible to filter only an acceleration sensor signal of an axis corresponding to each of the driving direction and the left/right direction and use the filtered acceleration sensor signals.

For the above operation, one axis of the two axes of the acceleration sensor 20 matches with respect to the driving direction of the moving object, and another axis of the acceleration sensor 20 matches with respect to the left/right direction of the moving object.

According to the present disclosure, when determining the straight-driving state or the turning state of the moving object, acceleration sensor signals of axes corresponding to the driving direction and the left/right direction respectively are used together to not affect the installation method of a navigation device in the moving object.

Also, the acceleration sensor 20 outputs an analog signal and thus the determination unit 40 may need to convert the analog signal into a recognizable digital signal. For the above operation, the signal processing unit 30 receives a sensor output signal of each axis of the acceleration sensor 20, converts the sensor output signal into a digital signal which is recognizable by the determination unit 40, and then transfers the converted sensor output signals to the determination unit 40.

The signal processing unit 30 may be an analog-to-digital (A/D) converter which converts an analog signal, which is an input signal, into a digital signal corresponding to a level of the analog signal.

The determination unit 40 may receive sensor output signals of the axes of the acceleration sensor 20, and determine whether the moving object is in the straight-driving state or in the turning state by using the received sensor output signals.

Specifically, the determination unit 40 periodically receives an acceleration sensor signal of each axis of the acceleration sensor 20 from the signal processing unit 30, and determines whether the moving object is in the straight-driving state or in the turning state based on the comparison result between the acceleration sensor signals of the different axes.

In this instance, information about the straight-driving state or the turning state of the moving object, which is determined by the determination unit 40, may be used as information when the navigation device calculates the current location of the moving object or when the navigation device guides a user along a path to a destination designated by the user.

Also, it is possible to implement all the control operations of the determination unit 40 using a control unit, without including a separate unit corresponding to the determination unit 40. The control unit includes a path guidance function and controls the overall operations of the navigation device.

Hereinafter, a method of determining, by the determination unit 40, a straight-driving state or a turning state of a moving object using the acceleration sensor 20 will be described in detail with reference to FIG. 2.

Referring to FIG. 2, while the moving object is being driven, a navigation device installed in the moving object reads a sensor output signal that is output from the acceleration sensor 20.

In operation S10, the method periodically reads an acceleration sensor signal Y of an axis corresponding to a driving direction of the moving object (hereinafter, referred to as 'driving directional sensor signal'), among sensor output signals of the acceleration sensor 20. Also, the driving directional sensor signal Y is synchronized and thereby an acceleration sensor signal X of an axis corresponding to a left/right direction of the moving object (hereinafter, referred to as 'left/right directional sensor signal') is read.

Also, the method calculates an absolute value |Y| of the read driving directional sensor signal Y and an absolute value |X| of the read left/right directional sensor signal X. Also, the method sums up the driving directional sensor signal Y with the left/right directional sensor signal X and calculates a level difference value X−Y between the signals X and Y.

Figure 3:
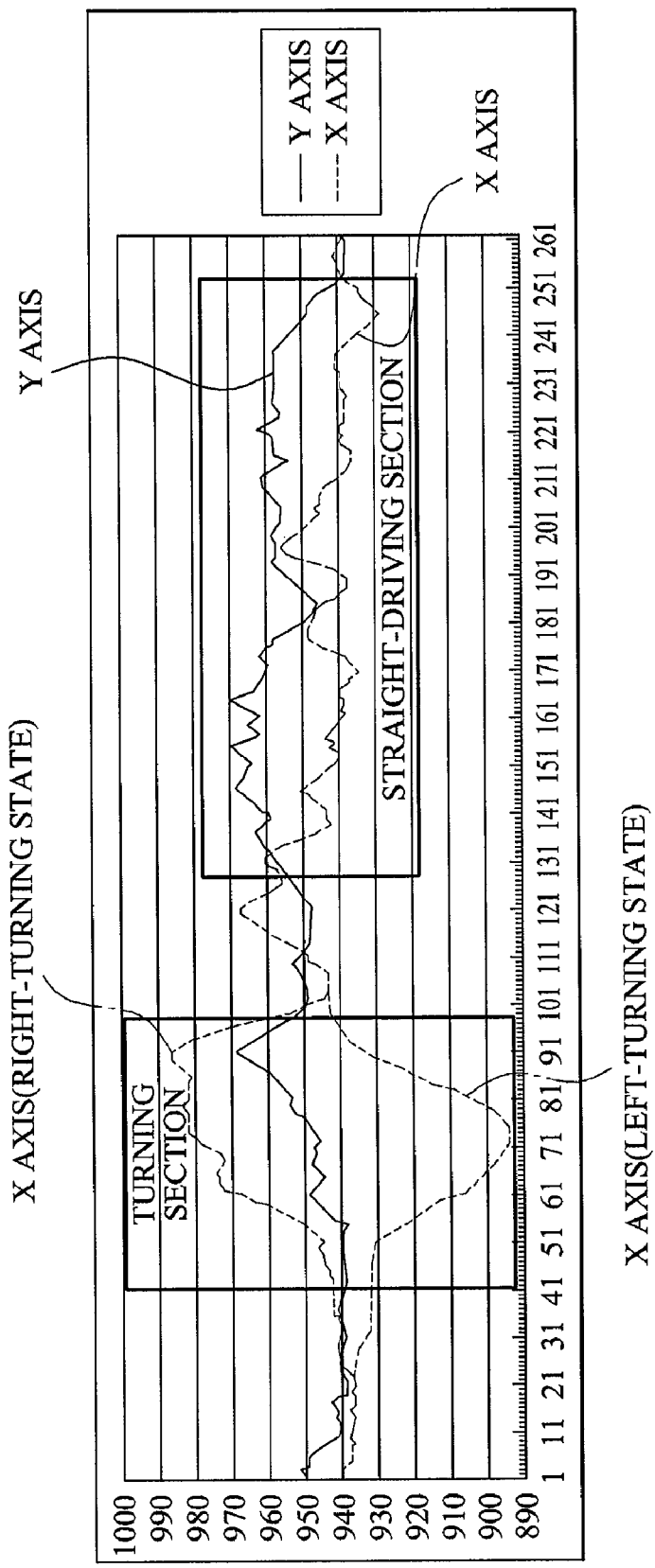
FIG. 3 is a graph illustrating an output signal of an acceleration sensor depending on a straight-driving state or a turning state of a moving object.

FIG. 3 is a graph illustrating an output signal of an acceleration sensor in a straight-driving state or in a turning state. As shown in FIG. 3, when the moving object is being driven straight, the acceleration sensor 20 outputs an acceleration value (sensor value) which is greater in an axis corresponding to the driving direction than in an axis corresponding to the left/right-turning direction at all times. Also, when the moving object is being turned left or right, the acceleration sensor 20 outputs an acceleration value which is greater than in the axis corresponding to the left/right-turning direction than in the axis corresponding to the driving direction at all times. Thus, even though the navigation device may be installed inclined towards one side, the above characteristic of the acceleration sensor 20 shows similar results to when comparing the driving directional sensor signal and the left/right directional sensor signal.

Based on the comparison between the driving directional sensor signal Y and the left/right directional sensor signal X using the characteristic of the acceleration sensor 20, it is determined whether the moving object is in the straight-driving state or the left/right-turning state.

In operation S20, it is determined whether the absolute value |Y| of the driving directional sensor signal Y is greater than the absolute value |X| of the left/right directional sensor signal X.

When the absolute value |Y| of the driving directional sensor signal Y is greater than the absolute value |X| of the left/right directional sensor signal X in operation S20, it is determined the moving object is in the straight-driving state in operation S30.

Conversely, when the absolute value |X| of the left/right directional sensor signal X is greater than the absolute value |Y| of the driving directional sensor signal Y in operation S20, it is determined the moving object is in the turning state.

When the moving object is in the turning state, it is determined whether the turning state is the left-turning state or the right-turning state. The determination is performed by using a level difference value X−Y between the calculated left/right directional sensor signal X and the driving direction sensor signal Y.

In operation S40, it is determined whether the level difference value X−Y between the left/right directional sensor signal X and the driving directional sensor signal Y has a positive value.

When the level difference value X−Y has the positive value as a result of the determination in operation S40, it is determined the moving object is in the right-turning state in operation S50. Conversely, when the level difference value X−Y has a negative value, it is determined the moving object is in the left-turning state in operation S60.

The determination condition about the straight-driving state or the turning state and the determination condition about the right-turning state or the left-turning state may be set to be opposite to the above-described condition based on the internal characteristic of the acceleration sensor 20 or a type of the acceleration sensor 20.

Therefore, according to the present disclosure, to reduce effects according to the installation state of a navigation device in a vehicle, a straight-driving state or a turning state of a moving object is determined by using an acceleration sensor output value of an axis corresponding to each of a left/right direction and a driving direction of the moving object.

The exemplary embodiments of the present disclosure include computer-readable media including program instructions to implement various operations embodied by a computer. The media may also include, alone or in combination with the program instructions, data files, data structures, tables, and the like. The media and program instructions may be those specially designed and constructed for the purposes of the present disclosure, or they may be of the kind well known and available to those having skill in the computer software arts. Examples of computer-readable media include magnetic media such as hard disks, floppy disks, and magnetic tape; optical media such as CD ROM disks; magneto-optical media such as floptical disks; and hardware devices that are specially configured to store and perform program instructions, such as read-only memory devices (ROM) and random access memory (RAM). Examples of program instructions include both machine code, such as produced by a compiler, and files containing higher level code that may be executed by the computer using an interpreter.

According to the present disclosure, there is provided a new method of determining a turning state which can determine a straight-driving state or a turning state of a moving object by using acceleration values of two axes of an acceleration sensor corresponding to a left/right direction and a driving direction respectively.

Particularly, since a left/right-turning state of a moving object is determined by using acceleration values of two axes, an installation state of a navigation device in a vehicle is not significantly affected. Accordingly, it is possible to reduce burden about the inaccurate installation of the navigation terminal. Also, even when the navigation terminal is inaccurately installed, it is possible to reduce an error about determination of a driving direction of the moving object.

According to the present disclosure, since acceleration values of two axes corresponding to a left/right direction and a driving direction of a moving object are considered, it is possible to more accurately determine whether the moving object is in a straight-driving state or in a turning state. Accordingly, it is possible to improve reliability about a navigation device.

Although a few embodiments of the present disclosure have been shown and described, the present disclosure is not limited to the described embodiments. Instead, it would be appreciated by those skilled in the art that changes may be made to these embodiments without departing from the principles and spirit of the present disclosure, the scope of which is defined by the claims and their equivalents.

The invention claimed is:

1. A method of determining a driving state using a sensor, the method comprising:

reading sensor output signals of different axes from an acceleration sensor while a moving object is being driven, wherein the acceleration sensor is an at least two axes acceleration sensor and detects an acceleration of the moving object, wherein one axis of the at least two aces of the acceleration sensor outputs an acceleration sensor signal Y with respect to a driving direction of the moving object, and another axis of the acceleration sensor outputs an acceleration signal X with respect to a left/right direction of the moving object; and comparing the read sensor output signals of the different axes and determining whether the moving object is in a straight-driving state or in a turning state, wherein the comparing and the determining comprises:

calculating an absolute value |Y| of the acceleration sensor signal Y with respect to the driving direction and an absolute value |X| of the acceleration sensor signal X with respect to the left/right direction; and determining whether the moving object is in the straight-driving state or in the turning state based on a size comparison between the calculated absolute values |Y| and |X|.

2. The method of claim 1, wherein the reading of the sensor output signals comprises:

periodically reading the acceleration sensor signal Y with respect to the driving direction while the moving object is being driven; and being synchronized with the acceleration sensor signal Y with respect to the driving direction and thereby reading the acceleration sensor signal X with respect to the left/right direction.

3. The method of claim 1, wherein the determining whether the moving object is in the straight-driving state or in the turning state comprises:

determining the moving object is in the straight-driving state when the absolute value |Y| of the acceleration sensor signal Y with respect to the driving direction is greater than the absolute value |X| of the acceleration sensor signal X with respect to the left/right direction; and determining the moving object is in the turning state when the absolute value |X| of the acceleration sensor signal X with respect to the left/right direction is greater than the absolute value |Y| of the acceleration sensor signal Y with respect to the driving direction, and determining the turning state of the moving object by using a level difference value X−Y between the acceleration sensor signals X and Y.

4. The method of claim 3, wherein the determining the turning state of the moving object comprises:

determining whether the moving object is in a right-turning state or in a left-turning state depending on whether the level difference value is a positive number or a negative number.

5. The method of claim 4, wherein the determining whether the moving object is in the right-turning state or in the left-turning state comprises:

determining the moving object is in the right-turning state when the level difference value has a positive value; and determining the moving object is in the left-turning state when the level difference value has a negative value.

6. A non-transitory computer-readable recording medium storing a program for implementing a method of determining a driving state using a sensor, the program comprising instructions for:

reading sensor output signals of different axes from an acceleration sensor while a moving object is being driven, wherein the acceleration sensor is an at least two axes acceleration sensor and detects an acceleration of the moving object, wherein one axis of the at least two axes of the acceleration sensor outputs an acceleration sensor signal Y with respect to a driving direction of the moving object, and another axis of the acceleration sensor outputs an acceleration signal X with respect to a left/right direction of the moving object; and comparing the read sensor output signals of the different axes and determining whether the moving object is in a straight-driving state or in a turning state, wherein the comparing and the determining comprises:

calculating an absolute value |Y| of the acceleration sensor signal Y with respect to the driving direction and an absolute value |X| of the acceleration sensor signal X with respect to the left/right direction; and determining whether the moving object is in the straight-driving state or in the turning state based on a size comparison between the calculated absolute values |Y| and |X|.

7. An apparatus for determining a turning state using a sensor, the apparatus comprising:

an acceleration sensor including at least two axes to detect an acceleration according to a driving direction of a moving object and outputting sensor output signals of different axes while the moving object is being driven, wherein one axis of the at least two axes of the acceleration sensor outputs an acceleration sensor signal Y with respect to a driving direction of the moving object and another axis of the acceleration sensor outputs an acceleration sensor signal X with respect to a left/right direction of the moving object; and a determination unit comparing the sensor output signals of the different axes, output from the acceleration sensor, and determining whether the moving object is in a straight-driving state or in a left-turning state or in a right-turning state, wherein the determination unit determines whether the moving object is in the straight-driving state or in the turning state based on a size comparison between an absolute value |Y| of the acceleration sensor signal Y with respect to the driving direction, and an absolute value |X| of the acceleration sensor signal X with respect to the left/right direction, and determines whether the moving object is in a right-turning state or in a left-turning state by using a level difference value X−Y between the acceleration sensor signals X and Y.

8. The apparatus of claim 7, wherein, when the acceleration sensor is a three-axis acceleration sensor including X, Y, and Z axes, the acceleration sensor uses only an acceleration sensor signal corresponding to each of axes with respect to the driving direction of the moving object and the left/right direction of the moving object among the three axes.

9. The apparatus of claim 7, further comprising:

a signal processing unit converting the sensor output signal into a signal, and outputting the converted sensor output signal to the determination unit, wherein the signal is recognizable by the determination unit.

10. The apparatus of claim 9, wherein the signal processing unit is an analog-to-digital (A/D) converter converting the sensor output signal into a digital signal which is in a range recognizable by the determination unit.

* * * * *